(12) United States Patent
Bates, Jr.

(10) Patent No.: US 10,323,375 B1
(45) Date of Patent: Jun. 18, 2019

(54) FLOATING LITTER TRAP

(71) Applicant: Donald W. Bates, Jr., Fairhope, AL (US)

(72) Inventor: Donald W. Bates, Jr., Fairhope, AL (US)

(73) Assignee: Osprey Initiative, LLC, Fairhope, AL (US)

( * ) Notice: Subject to any disclaimer, the term of this patent is extended or adjusted under 35 U.S.C. 154(b) by 0 days.

(21) Appl. No.: 15/784,515

(22) Filed: Oct. 16, 2017

Related U.S. Application Data

(60) Provisional application No. 62/498,072, filed on Dec. 14, 2016.

(51) Int. Cl.
| | |
|---|---|
| E02B 15/10 | (2006.01) |
| B63B 35/32 | (2006.01) |
| E02B 15/06 | (2006.01) |
| B01D 15/00 | (2006.01) |
| B01D 39/12 | (2006.01) |
| E02B 15/08 | (2006.01) |
| E02B 8/02 | (2006.01) |

(52) U.S. Cl.
CPC .............. *E02B 15/10* (2013.01); *B01D 15/00* (2013.01); *B01D 39/12* (2013.01); *B63B 35/32* (2013.01); *E02B 8/023* (2013.01); *E02B 15/06* (2013.01); *E02B 15/0835* (2013.01)

(58) Field of Classification Search
CPC . E02B 8/02; E02B 8/023; E02B 15/04; E02B 15/048; E02B 15/06; E02B 15/0835; E02B 15/0885; E02B 15/10
USPC .......... 210/162, 170.05, 170.1, 242.1, 242.4, 210/747.6, 776; 405/60, 63
See application file for complete search history.

(56) References Cited

U.S. PATENT DOCUMENTS

| | | | | | |
|---|---|---|---|---|---|
| 3,653,510 | A | * | 4/1972 | Fitzgerald | ............. E02B 15/048 210/776 |
| 3,850,807 | A | * | 11/1974 | Jones | .................... E02B 15/106 210/170.05 |
| 4,000,532 | A | * | 1/1977 | Nielsen | ............... E02B 15/0835 405/70 |
| 4,124,981 | A | * | 11/1978 | Preus | .................. E02B 15/0885 210/923 |

(Continued)

FOREIGN PATENT DOCUMENTS

| | | | |
|---|---|---|---|
| FR | 2227750 | * | 11/1974 |
| GB | 2074887 | * | 11/1981 |
| GB | 2095571 | * | 10/1982 |

*Primary Examiner* — Christopher Upton
(74) *Attorney, Agent, or Firm* — Bush Intellectual Property Law; Kenneth M. Bush

(57) ABSTRACT

A floating litter collection system for collecting floating debris from the surface of water flowing in a water stream, comprising a wire mesh container having an open front end, a first buoyant device secured to a first side of the container, a second buoyant device secured to the second side of the container, and a pair of mooring lines for anchoring the container to the water banks of the water stream. The system may include a pair of floating booms secured to the mooring lines to direct debris floating on the surface of the water into the container. The system may include a fin attached to the bottom of the container to orient the front end of the container in an upstream direction. The system may include a floating anchor to orient the front end of the container in an upstream direction.

19 Claims, 3 Drawing Sheets

(56) References Cited

U.S. PATENT DOCUMENTS

| | | | | |
|---|---|---|---|---|
| 4,211,659 A | * | 7/1980 | Nyfeldt | E02B 15/048 |
| | | | | 210/242.3 |
| 4,362,631 A | * | 12/1982 | Bocard | E02B 15/048 |
| | | | | 210/776 |
| 5,028,325 A | * | 7/1991 | Hamilton | E02B 15/104 |
| | | | | 210/242.1 |
| 5,165,821 A | * | 11/1992 | Fischer | E02B 15/06 |
| | | | | 405/63 |
| 5,223,135 A | * | 6/1993 | MacPhee | E04H 4/16 |
| | | | | 210/242.1 |
| 6,187,181 B1 | | 2/2001 | Stoltz et al. | |
| 6,270,683 B1 | | 8/2001 | Turner | |
| 6,379,541 B1 | | 4/2002 | Nicholas | |
| 6,860,677 B2 | | 3/2005 | Johnston | |
| 7,153,417 B2 | | 12/2006 | Happel | |
| 7,972,504 B2 | | 7/2011 | Weiss | |
| D667,529 S | | 9/2012 | Vreeland | |
| 9,260,853 B2 | | 2/2016 | Pank | |
| 2007/0151913 A1 | * | 7/2007 | Riley | C02F 1/001 |
| | | | | 210/242.1 |
| 2010/0025314 A1 | | 2/2010 | Cheng | |
| 2011/0280660 A1 | * | 11/2011 | Bahukudumbi | E02B 15/06 |
| | | | | 405/63 |
| 2013/0146519 A1 | * | 6/2013 | Heimtun | E02B 15/048 |
| | | | | 210/242.1 |
| 2014/0158598 A1 | | 6/2014 | Happel | |
| 2015/0034565 A1 | * | 2/2015 | Vaz Viegas | E02B 15/10 |
| | | | | 210/747.5 |
| 2015/0247332 A1 | | 9/2015 | Norberto, III et al. | |

* cited by examiner

FLOATING LITTER TRAP

CROSS-REFERENCE TO RELATED APPLICATION

This application claims priority to U.S. Provisional Patent Application No. 62/498,072 filed Dec. 14, 2016, the disclosure of which is incorporated herein by reference.

FIELD OF THE INVENTION

The present invention relates to litter collection systems and, more particularly, to a floating litter collection system for collecting floating debris from the surface of flowing water.

BACKGROUND OF THE INVENTION

Removing litter and other floating debris from surface waters is desirable. Currently, large water cleaning systems are typically implemented in downstream collection points. An example of such a system is taught in U.S. Pat. No. 6,379,541 to Nicholas, the disclosure of which is incorporated herein by reference. These systems are typically expensive to implement and maintain, and as a result, these systems are only located in downstream locations. Thus, small upstream water channels, where much of the debris originates and gets trapped, are not addressed. In addition, due to the expense of these large systems, a watershed will typically only have one water cleaning system if it has any at all. Accordingly, what is needed is a litter collection system for collecting floating debris from the surface of flowing water in small water streams wherein the litter collection system is lightweight, portable, inexpensive, and easily deployable in multiple locations throughout a watershed.

SUMMARY OF THE INVENTION

The present invention is a floating litter collection system for collecting floating debris from the surface of water flowing in a water stream, comprising a porous container having an open front end. The rear end, top, bottom, first side, and opposing second side of the container are made of a water permeable material, such as a rigid wire mesh coated with plastic, to allow water flow therethrough. The system further comprises a first buoyant device secured to the first side of the container and a second buoyant device secured to the second side of the container, wherein the buoyant devices are operable to maintain the container at the surface of the water stream such that water flows into the container through the front end. The system further comprises a first mooring line attached to the first side of the container and a second mooring line attached to the second side of the container, wherein the mooring lines are operable to anchor the container to the water banks of the water stream. The system preferably further comprises a first floating boom secured to the first mooring line and a second floating boom secured to the second mooring line, wherein the floating booms are operable to direct debris floating on the surface of the water into the container. The system may include a fin attached to the bottom of the container to orient the front end of the container in an upstream direction as water flows past the fin. The system may include a floating anchor, or other flow resistance device, attached to the rear end of the container to orient the front end of the container in an upstream direction as flowing water engages the floating anchor.

These and other features of the invention will become apparent from the following detailed description of the invention.

Figure 1:
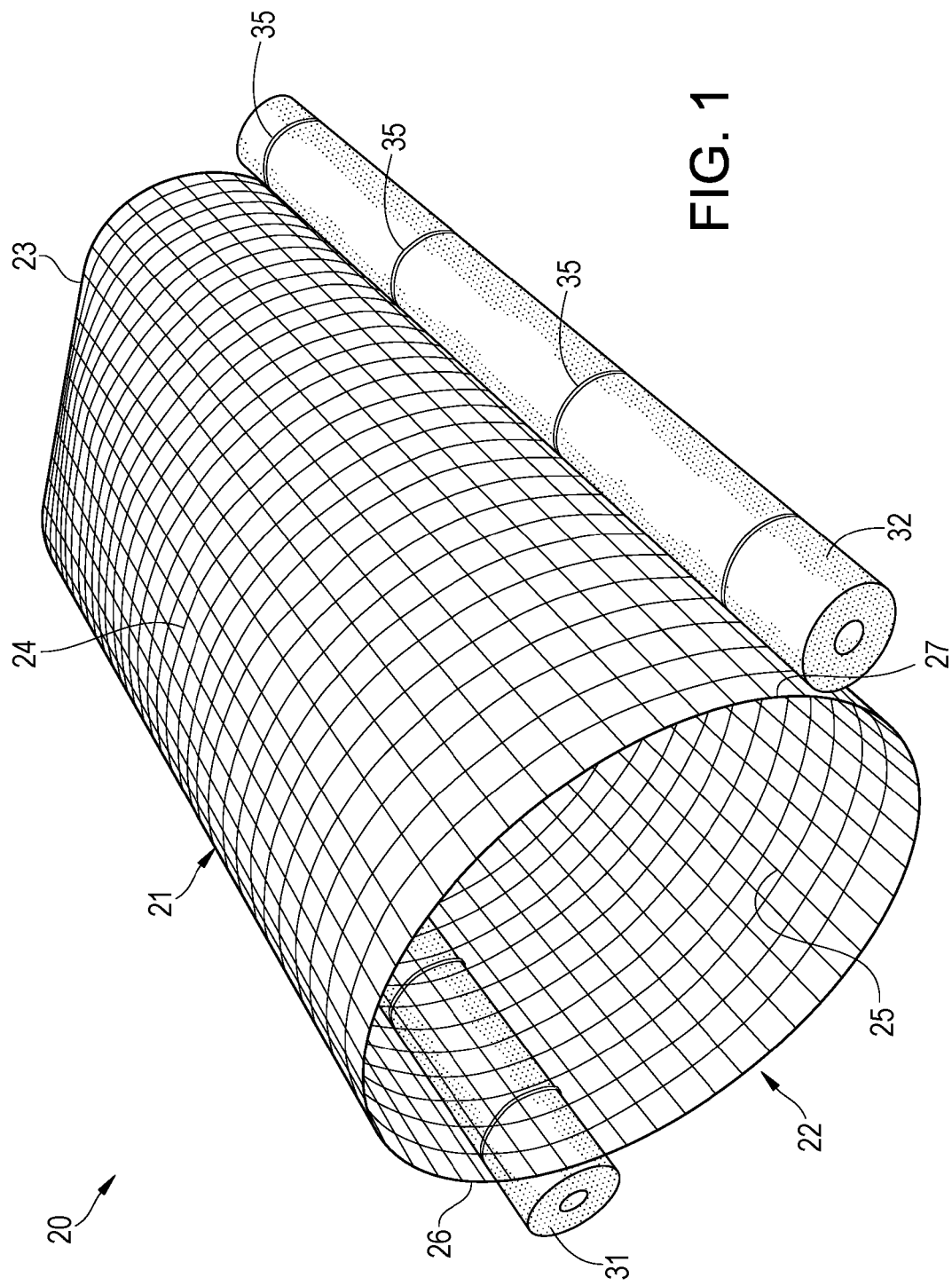
FIG. 1 shows a preferred embodiment of the invention.

When the terms "top," "bottom," "right," "left," "front," "rear," "first," "second," "inside," "outside," and similar terms are used, the terms should be understood in reference to the orientation of the implementations shown in the drawings and are utilized to facilitate description thereof.

DETAILED DESCRIPTION OF THE INVENTION

Figure 2:
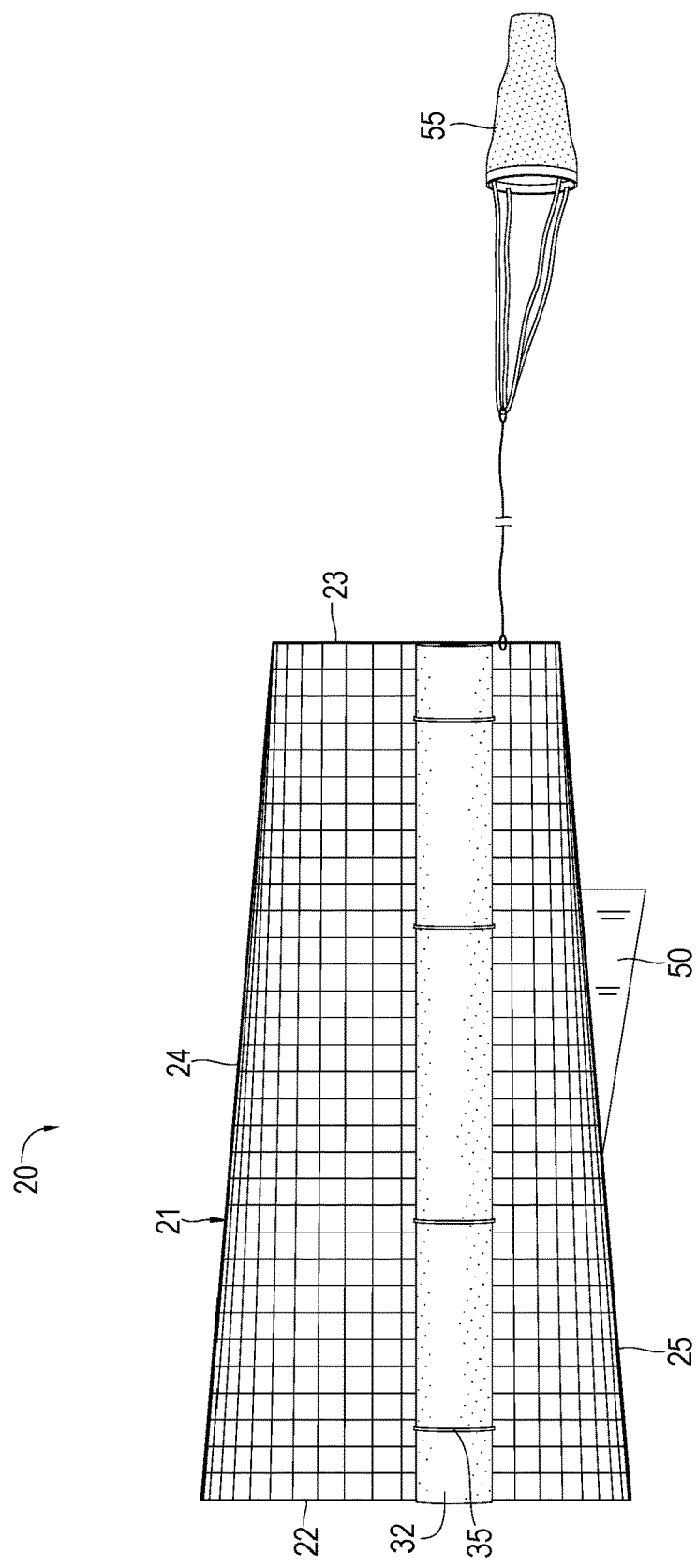
FIG. 2 shows an alternate embodiment of the invention.
Figure 3:
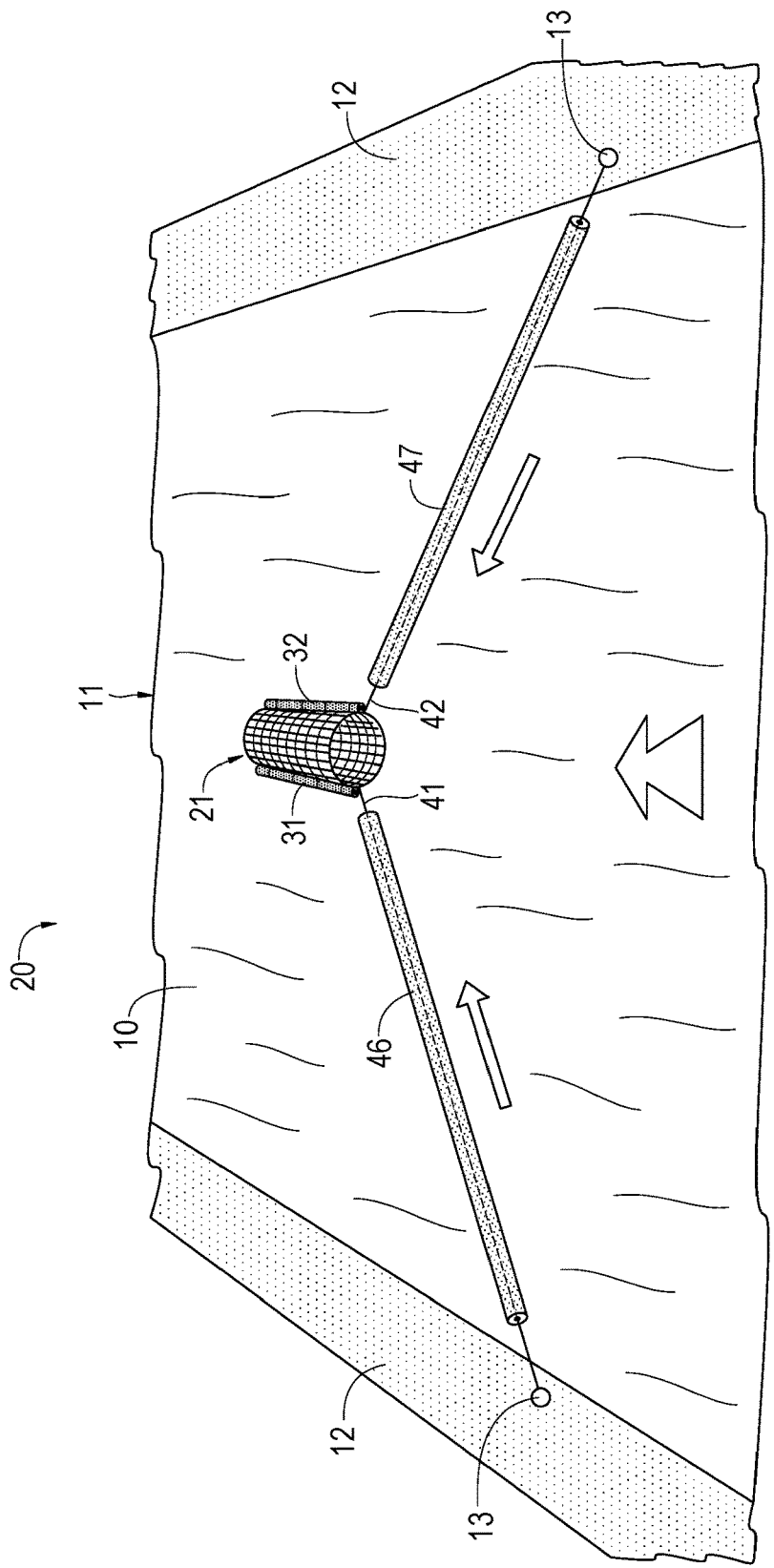
FIG. 3 shows the invention deployed in a water stream.
In the Figures, portions of the container that can be seen through the porous material (e.g. wire mesh) have been eliminated for ease of illustration.

The preferred embodiments of the present invention are shown in FIGS. 1-3, wherein the invention is a floating litter collection system 20 for collecting floating debris from the surface of water 10 flowing in a water stream 11. The litter collection system 20 comprises a porous container 21 having an open front end 22, a rear end 23, a top 24, a bottom 25, a first side 26, and an opposing second side 27. The rear end 23, top 24, bottom 25, first side 26, and second side 27 are made of a water permeable porous material to allow water flow therethrough. The water permeable material is preferably a wire mesh coated with plastic, but other rigid materials that are resistant to corrosion could be used. The mesh size can vary depending on the location in which the system is to be deployed and what types of debris are desired to be collected and what types of debris are desired to be allowed to pass through the container 21. The front end 22 of the container 21 can include an inwardly facing rim (not shown) to prevent backflow of debris out of the container 21, for example, in locations where strong wind or tidal changes are a factor. The shape of the container 21 is shown in FIG. 1 as being round in the front and elliptical in the rear, but any desired shape can be used.

The litter collection system 20 further comprises a first buoyant device 31 secured to the first side 26 of the container 21 and a second buoyant device 32 secured to the second side 27 of the container 21, wherein the first buoyant device 31 and the second buoyant device 32 are operable to maintain the container 21 at the surface of the water stream 11 such that the flowing water 10 flows into the container 21 through the front end 22. The first buoyant device 31 and second buoyant device 32 are preferably secured to the container 21 with a plurality of flexible plastic ties 35. The first buoyant device 31 and second buoyant device 32 are preferably made of tubular polyethylene foam. Additional buoyant devices or different types of buoyant mechanisms can be used if desired.

The litter collection system 20 further comprises a first mooring line 41 attached to the first side 26 of the container 21 and a second mooring line 42 attached to the second side 27 of the container 21, wherein the first mooring line 41 and the second mooring line 42 are operable to anchor the container 21 to the banks 12 of the water stream 11 at anchor points 13. The first mooring line 41 and second mooring line 42 are preferably made of a nylon or polyester rope. The mooring lines 41, 42 can include a break-away mechanism (not shown) such that that the mooring lines 41, 42 can detach from the anchor points 13 and/or the container 21 if desired.

The litter collection system 20 preferably further comprises a first floating boom 46 secured to the first mooring line 41 and a second floating boom 47 secured to the second mooring line 42, wherein the first floating boom 46 and the second floating boom 47 are operable to either trap floating debris or direct floating debris on the surface of the water 10 into the container 21. The first floating boom 46 and second floating boom 47 are preferably made of tubular polyethylene foam. The first floating boom 46 and second floating boom 47 may include an absorptive material, such as a polypropylene sorbent, for absorbing chemicals from, for example, petrochemical spills.

The litter collection system 20 may include a fin 50 attached to the bottom 25 of the container 21 to orient the front end 22 of the container 21 in an upstream direction as water 10 flows past the fin 50. In addition to the fin 50, or alternatively thereto, the system 20 may include a floating anchor 55, or other flow resistance device, attached to the rear end 23 of the container 21, wherein the floating anchor 55 is operable to orient the front end 22 of the container 21 in an upstream direction as flowing water 10 engages the floating anchor 55.

The litter collection system 20 of the present invention is lightweight, portable, inexpensive, and requires little maintenance. As a result, multiple collection systems 20 can be easily deployed throughout a watershed.

While the invention has been shown and described in some detail with reference to specific exemplary embodiments, there is no intention that the invention be limited to such detail. On the contrary, the invention is intended to include any alternative or equivalent embodiments that fall within the spirit and scope of the invention as described and claimed herein.

The invention claimed is:

1. A lightweight, portable, floating litter collection system for collecting floating debris from the surface of water flowing in a water stream, consisting of:
   a. a porous container having an open front end, a rear end, a top, a bottom, a first side, and an opposing second side, wherein said rear end, said top, said bottom, said first side, and said second side are made of a water permeable material to allow water flow therethrough;
   b. a first tubular foam buoyant device secured to said first side of said container from said front end to said rear end and a second tubular foam buoyant device secured to said second side of said container from said front end to said rear end, wherein each of said first tubular foam buoyant device and said second tubular foam buoyant device is secured to said container with a plurality of flexible plastic ties, wherein said first tubular foam buoyant device and said second tubular foam buoyant device are operable to maintain said container at the surface of the water stream such that the flowing water flows into said container through said front end;
   c. a flexible first mooring line attached to said first side of said container at said front end and a flexible second mooring line attached to said second side of said container at said front end, wherein said first mooring line and said second mooring line are operable to anchor said container to the water banks of the water stream such that said front end of said container is oriented in an upstream direction; and
   d. a first tubular foam floating boom secured to said first mooring line and a second tubular foam floating boom secured to said second mooring line, wherein said first tubular foam floating boom and said second tubular foam floating boom are operable to direct debris floating on the surface of the water into said container.

2. A floating litter collection system according to claim 1, wherein said water permeable material is a rigid wire mesh coated with plastic.

3. A floating litter collection system according to claim 1, wherein each of said first tubular foam buoyant device and said second tubular foam buoyant device is tubular polyethylene foam.

4. A floating litter collection system according to claim 1, wherein each of said first mooring line and said second mooring line is selected from the group consisting of nylon rope and polyester rope.

5. A floating litter collection system according to claim 1, wherein each of said first tubular foam floating boom and said second tubular foam floating boom comprises tubular polyethylene foam.

6. A lightweight, portable, floating litter collection system for collecting floating debris from the surface of water flowing in a water stream, consisting of:
   a. a porous container having an open front end, a rear end, a top, a bottom, a first side, and an opposing second side, wherein said rear end, said top, said bottom, said first side, and said second side are made of a water permeable material to allow water flow therethrough;
   b. a first tubular foam buoyant device secured to said first side of said container from said front end to said rear end and a second tubular foam buoyant device secured to said second side of said container from said front end to said rear end, wherein each of said first tubular foam buoyant device and said second tubular foam buoyant device is secured to said container with a plurality of flexible plastic ties, wherein said first tubular foam buoyant device and said second tubular foam buoyant device are operable to maintain said container at the surface of the water stream such that the flowing water flows into said container through said front end;
   c. a flexible first mooring line attached to said first side of said container at said front end and a flexible second mooring line attached to said second side of said container at said front end, wherein said first mooring line and said second mooring line are operable to anchor said container to the water banks of the water stream such that said front end of said container is oriented in an upstream direction;
   d. a first tubular foam floating boom secured to said first mooring line and a second tubular foam floating boom secured to said second mooring line, wherein said first tubular foam floating boom and said second tubular foam floating boom are operable to direct debris floating on the surface of the water into said container; and
   e. a fin attached to said bottom of said container, wherein said fin is operable to orient said front end of said container in an upstream direction as water flows past said fin.

7. A floating litter collection system according to claim 6, wherein said water permeable material is a rigid wire mesh coated with plastic.

8. A floating litter collection system according to claim 6, wherein each of said first tubular foam buoyant device and said second tubular foam buoyant device is tubular polyethylene foam.

9. A floating litter collection system according to claim 6, wherein each of said first mooring line and said second mooring line is selected from the group consisting of nylon rope and polyester rope.

10. A floating litter collection system according to claim 6, wherein each of said first tubular foam floating boom and said second tubular foam floating boom comprises tubular polyethylene foam.

11. A lightweight, portable, floating litter collection system for collecting floating debris from the surface of water flowing in a water stream, comprising:
   a. a porous container having an open front end, a rear end, a top, a bottom, a first side, and an opposing second side, wherein said rear end, said top, said bottom, said first side, and said second side are made of a water permeable material to allow water flow therethrough;
   b. a first tubular foam buoyant device secured to said first side of said container and a second tubular foam buoyant device secured to said second side of said container, wherein said first tubular foam buoyant device and said second tubular foam buoyant device are operable to maintain said container at the surface of the water stream such that the flowing water flows into said container through said front end;
   c. a flexible first mooring line attached to said first side of said container at said front end and a flexible second mooring line attached to said second side of said container at said front end, wherein said first mooring line and said second mooring line are operable to anchor said container to the water banks of the water stream such that said front end of said container is oriented in an upstream direction; and
   d. a first tubular foam floating boom secured to said first mooring line and a second tubular foam floating boom secured to said second mooring line, wherein said first tubular foam floating boom and said second tubular foam floating boom are operable to direct debris floating on the surface of the water into said container.

12. A floating litter collection system according to claim 11, wherein said water permeable material is a rigid wire mesh coated with plastic.

13. A floating litter collection system according to claim 11, wherein each of said first tubular foam buoyant device and said second tubular foam buoyant device is tubular polyethylene foam.

14. A floating litter collection system according to claim 11, wherein each of said first mooring line and said second mooring line is selected from the group consisting of nylon rope and polyester rope.

15. A floating litter collection system according to claim 11, wherein each of said first tubular foam floating boom and said second tubular foam floating boom comprises tubular polyethylene foam.

16. A floating litter collection system according to claim 15, wherein each of said first tubular foam floating boom and said second tubular foam floating boom further comprises a polypropylene sorbent for absorbing chemicals.

17. A floating litter collection system according to claim 11, wherein said first tubular foam buoyant device is secured to said first side of said container from said front end to said rear end and said second tubular foam buoyant device is secured to said second side of said container from said front end to said rear end, wherein each of said first tubular foam buoyant device and said second tubular foam buoyant device is secured to said container with a plurality of flexible plastic ties.

18. A floating litter collection system according to claim 11, further comprising a fin attached to said bottom of said container, wherein said fin is operable to orient said front end of said container in an upstream direction as water flows past said fin.

19. A floating litter collection system according to claim 11, further comprising a flow resistance device attached to said rear end of said container, wherein said flow resistance device is operable to orient said front end of said container in an upstream direction as flowing water engages said flow resistance device.

* * * * *